F. D. LEPPER.
COMBINED KETTLE AND VEGETABLE COOKER.
No. 171,827.            Patented Jan. 4, 1876.
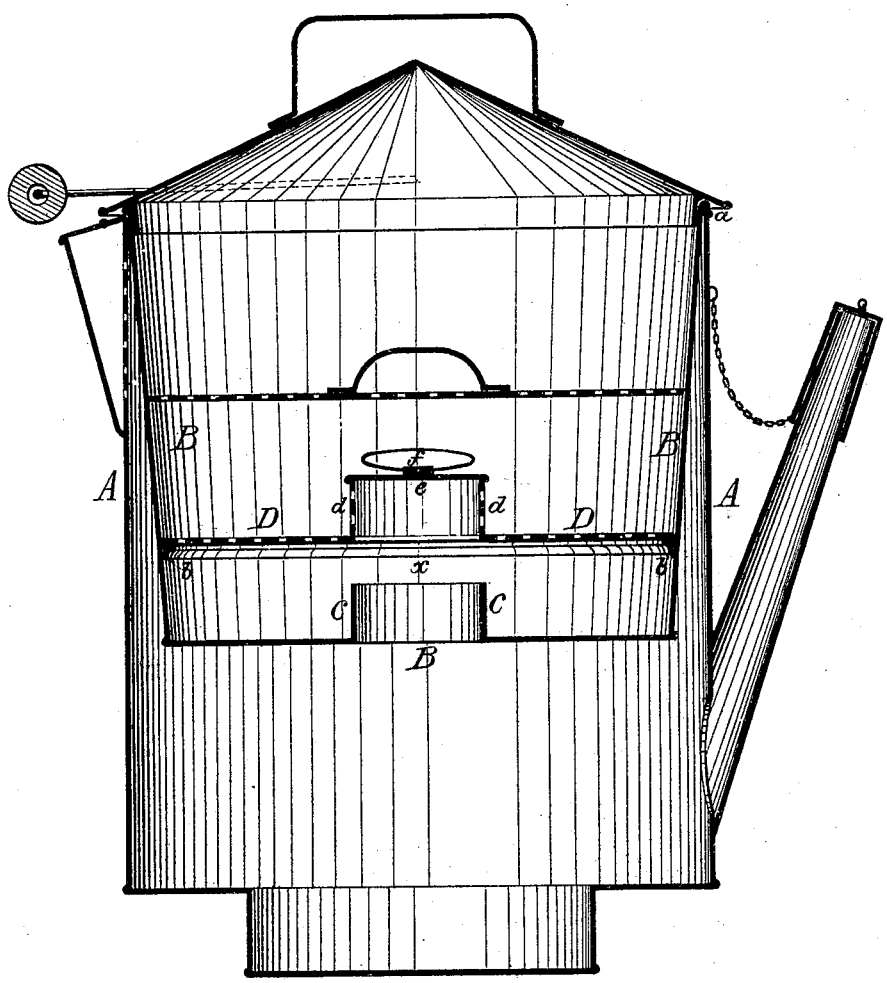

UNITED STATES PATENT OFFICE.

FRANKLIN D. LEPPER, OF LAKE MILLS, ASSIGNOR OF ONE-HALF HIS RIGHT TO ABRAM W. HILL, OF BENSON GROVE, IOWA.

IMPROVEMENT IN COMBINED KETTLES AND VEGETABLE-COOKERS.

Specification forming part of Letters Patent No. 171,827, dated January 4, 1876; application filed June 19, 1875.

*To all whom it may concern:*

Be it known that I, FRANKLIN D. LEPPER, of Lake Mills, in the county of Winnebago and State of Iowa, have invented certain new and useful Improvements in Combined Tea-Kettle and Vegetable-Cooker; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention consists in the construction and arrangement of certain devices, which may be used in combination with an ordinary tea-kettle or boiler, so as to form a vessel for the cooking of vegetables, &c., by steam; and it consists, also, in the combination of these devices with an ordinary tea-kettle or boiler, as hereinafter more fully set forth.

A represents an ordinary (No. 8 or No. 9) tin tea-kettle, provided with a closely-fitting cover, and with a body about ten inches in height. B is an open vessel, with inclining sides and a flat bottom, and which, when inserted into A, will fit perfectly tight around the upper rim $a$ of the kettle A. The bottom of B is perforated in the center, and the hole is encircled by an upright projecting rim, C, so as to form a low open tube, as shown. D is a false bottom, made either of wire-cloth or of perforated sheet metal, which rests, some distance above the bottom of B, on a projecting rim or brackets, $b$, projecting from the interior wall of B. An opening is cut in the center of D, to correspond with the hole in B below, and is encircled in like manner with a perforated rim, $d$, forming a short tube, which is closed at its top by the roof or cap $e$. $f$ is a bent wire, soldered to D and up along $d$, so as to form a catch or handle, by which D may be removed from the vessel B. Water is poured into A until it stands a little below the bottom of B. B with D is then inserted, and the vegetables placed upon D and around $d$. The cover is then put on, the spout closed by a cap or cork, and the kettle put over the fire. When the water boils steam rises up through C into the intermediate steam-chamber $x$, and from there up through the perforations in D and $d$ up into the cooking-vessel B. The steam, as it condenses, descends upon D and drips through the perforations down into $x$, where it is retained and prevented from running back into the kettle by the rim C. By this arrangement the water in A will remain pure and sweet, and may be used subsequently for tea, coffee, &c. When the vegetables are cooked, B is removed, the contents taken out, the false bottom lifted off, and the condensed steam, impregnated with the flavor of the vegetables it has served to cook, which makes it unfit for any further use, is poured off.

Having thus described my invention, I claim and desire to secure by Letters Patent—

1. The combination of the perforated vessel B, rim C, perforated false bottom D, and perforated upright closed tube $d$, substantially as and for the purpose set forth.

2. The combination of the kettle or boiler A with the perforated cooking vessel B, having rim C, perforated false bottom D, and perforated upright closed tube $d$, substantially as and for the purpose specified.

In testimony that I claim the foregoing as my own I have hereunto affixed my signature in presence of two witnesses.

FRANKLIN D. LEPPER.

Witnesses:
F. M. PORTER,
MYRON L. HUMAN.